US009117365B2

(12) United States Patent
Yano et al.

(10) Patent No.: US 9,117,365 B2
(45) Date of Patent: Aug. 25, 2015

(54) DEVICE IDENTIFICATION APPARATUS AND REMOTE CONTROL SYSTEM

(71) Applicant: Seiko Instruments Inc., Chiba-shi, Chiba (JP)

(72) Inventors: Hironori Yano, Chiba (JP); Fumiyasu Utsunomiya, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 86 days.

(21) Appl. No.: 13/784,149

(22) Filed: Mar. 4, 2013

(65) Prior Publication Data

US 2013/0251372 A1 Sep. 26, 2013

(30) Foreign Application Priority Data

Mar. 22, 2012 (JP) ................................ 2012-065980

(51) Int. Cl.
*H04B 10/00* (2013.01)
*G08C 23/04* (2006.01)

(52) U.S. Cl.
CPC ..................................... *G08C 23/04* (2013.01)

(58) Field of Classification Search
CPC .................................. H04J 14/06; H04J 14/08
USPC .......................................................... 398/112
See application file for complete search history.

(56) References Cited

U.S. PATENT DOCUMENTS 6,130,625 A * 10/2000 Harvey ...................... 340/12.24
6,507,725 B1 1/2003 Adams et al.
6,594,494 B1 * 7/2003 Kakehi ......................... 455/437
6,636,157 B1 * 10/2003 Sato ............................ 340/12.5
6,750,781 B1 * 6/2004 Kim ........................... 340/12.32
7,352,288 B2 * 4/2008 Miyake ........................ 340/12.3
7,639,907 B2 * 12/2009 Elberbaum ..................... 385/24
7,877,588 B2 * 1/2011 Gharapetian ..................... 713/1
8,233,803 B2 7/2012 Meyer et al.
8,508,401 B1 * 8/2013 Patel et al. .................... 341/176
8,655,179 B2 2/2014 Al-Kadi et al.
2003/0014535 A1 * 1/2003 Mora ............................ 709/235
2005/0017872 A1 * 1/2005 Miyake .................... 340/825.72
2005/0119770 A1 * 6/2005 Park et al. ........................ 700/65
2005/0174253 A1 * 8/2005 Altman .................... 340/825.72
2006/0013094 A1 1/2006 Miyake et al.
2006/0143572 A1 * 6/2006 Scott et al. .................... 715/765
2006/0159001 A1 * 7/2006 Imanishi .................... 369/275.4
(Continued)

FOREIGN PATENT DOCUMENTS

JP 07-123479 A 5/1995

OTHER PUBLICATIONS

Office Action for U.S. Appl. No. 13/785,475 dated Jul. 16, 2014, 9 pages.

*Primary Examiner* — David Payne
*Assistant Examiner* — Pranesh Barua
(74) *Attorney, Agent, or Firm* — Brinks Gilson & Lione

(57) ABSTRACT

Each device identification apparatus includes a circuit for generating a delay time and transmits a device identification code signal at a different delay time in response to a device selecting signal from a remote controller, thereby making it possible to prevent interference. Further, an infrared light amount detecting circuit is provided in a device identification apparatus or a remote controller, and an electronic device to which a device identification apparatus having a higher intensity of infrared is attached is displayed on the remote controller so that the electronic device is easily selected.

5 Claims, 2 Drawing Sheets

(56) References Cited

U.S. PATENT DOCUMENTS

| | | | | |
|---|---|---|---|---|
| 2008/0157840 | A1* | 7/2008 | Sperlich et al. | 327/161 |
| 2008/0258870 | A1* | 10/2008 | Sugiura | 340/7.23 |
| 2009/0220243 | A1 | 9/2009 | Petricoin et al. | |
| 2011/0031419 | A1 | 2/2011 | Fukui et al. | |
| 2011/0080120 | A1* | 4/2011 | Talstra et al. | 315/312 |
| 2011/0193781 | A1 | 8/2011 | Utsunomiya | |
| 2011/0217040 | A1* | 9/2011 | Mori | 398/53 |
| 2011/0266889 | A1 | 11/2011 | Blohm | |
| 2012/0098692 | A1* | 4/2012 | Talstra et al. | 341/176 |
| 2012/0135692 | A1* | 5/2012 | Feri et al. | 455/67.14 |
| 2012/0169482 | A1 | 7/2012 | Chen et al. | |

* cited by examiner

DEVICE IDENTIFICATION APPARATUS AND REMOTE CONTROL SYSTEM

RELATED APPLICATIONS

This application claims priority under 35 U.S.C. §119 to Japanese Patent Application No. 2012-065980 filed on Mar. 22, 2012, the entire content of which is hereby incorporated by reference.

BACKGROUND OF THE INVENTION

1. Field of the Invention

The present invention relates to a multi remote control system which is able to remotely control a plurality of electronic devices, and particularly to a remote control system which is able to select an operation target comfortably without interference even in an environment in which a plurality of device identification apparatuses exists.

2. Description of the Related Art

In recent years, a lot of electronic devices which are operable by a remote controller have been widely used at home, and a plurality of remote controllers often exists in the same room. Therefore, when a desired device is intended to be operated by a remote controller, other remote controllers may interfere with the remote controller or it may take time to search for the remote controller.

In order to solve the problem, products such as a learning remote controller and a multi-remote controller only by which functions of a plurality of remote controllers are provided are commercially available.

However, they have such a problem that it is necessary to manually resister functions to be used in advance, which takes a lot of trouble, that only determined functions are usable and a remote control function of a new electronic device cannot be added, or that there are many buttons, which causes difficulty in operation.

In order to deal with that, such a technique is proposed that a device identification code signal is transmitted from a device identification apparatus provided in an electronic device so as to modify the remote controller to have a function to operate the device.

FIG. 5 is an internal block diagram of a conventional device identification apparatus. The device identification apparatus is constituted by an infrared receiving section 101, a signal decryption section 102, and an infrared transmitting section 105. The infrared receiving section 101 receives a device selecting signal from a remote controller via infrared, and passes a code signal included therein to the signal decryption section 102. The signal decryption section 102 decrypts a meaning of the code signal, and if it is a device selecting signal from the remote controller, the signal decryption section 102 requests the infrared transmitting section 105 to transmit a device identification code signal. The infrared transmitting section 105 transmits a device identification code signal to the remote controller via infrared.

Here, the following deals with interference measures in a case where a plurality of electronic devices to each of which a device identification apparatus is attached are provided at a short distance and a device selecting signal from the remote controller reaches the plurality of device identification apparatuses at the same time.

For the device identification apparatuses, respective carriers for transmitting a device identification code signal are set to frequencies different from each other. The remote controller is provided with a band-pass filter so as to receive infrared signals having different carrier frequencies. The device identification apparatuses and the remote controller are configured in this way so as to transmit and receive infrared signals, thereby preventing interference.

The remote controller may further include a comparison circuit, so that it is also possible to select a device of a signal having a highest intensity by comparing intensities of received infrared signals (see, for example, Patent Document 1).

[Patent Document 1] Japanese Patent Application Laid-Open No. 7-123479

SUMMARY OF THE INVENTION

However, the conventional remote control system as described above has a problem as follows.

The remote controller requires a circuit such as a band-pass filter and the device identification apparatus requires a circuit for switching to a different oscillation frequency, thereby increasing a cost of a remote control system. Further, since infrared signals having different carrier frequencies are transmitted at the same time from a plurality of device identification apparatuses, the remote controller is easy to be affected by neighboring environmental noise and communication between the remote controller and the device identification apparatuses is unstable.

A remote control system of the present invention realizes a remote control system which is able to comfortably select a device which a user wants to operate, without addition of a complicated circuit to a remote controller even in a state where a plurality of device identification apparatuses exists at a short distance.

In order to solve the above problems, a remote control system of the present invention includes: a device identification apparatus including a receiving section for receiving an optical signal from a remote controller, a signal decryption section for decrypting the signal thus received by the receiving section, a transmitting section for transmitting a device identification signal when the signal thus decrypted is a device selecting signal, and a delay generation section provided between the signal decryption section and the transmission section, the delay generation section being for generating a delay time set in advance so that, at the time of transmission of the device identification signal, the transmitting section transmits the device identification signal after the delay time has passed; and a remote controller for receiving the device identification signal to identify a corresponding device from the device identification apparatus and for storing and transmitting codes to control various devices.

According to the present invention, since any complicated circuit is not necessary to be added to a remote controller, interference between the remote controller and device identification apparatuses is prevented, and an electronic device which is closer to the remote controller and is precisely opposed to the remote controller is easily selected, it is possible to realize a remote control system in which a device which a user wants to operate is easily selected.

DETAILED DESCRIPTION OF THE PREFERRED EMBODIMENTS

A device identification apparatus in a remote control system of the present embodiment includes a circuit for generating a delay time. Each device identification apparatus is able to prevent interference to a device selecting signal from a remote controller by transmitting a device identification code signal at a different delay time. Further, an infrared light amount detecting circuit is provided in a device identification apparatus or a remote controller, and an electronic device to which a device identification apparatus having a higher intensity of infrared is attached is displayed on the remote controller so that the electronic device is easily selected.

Figure 1:
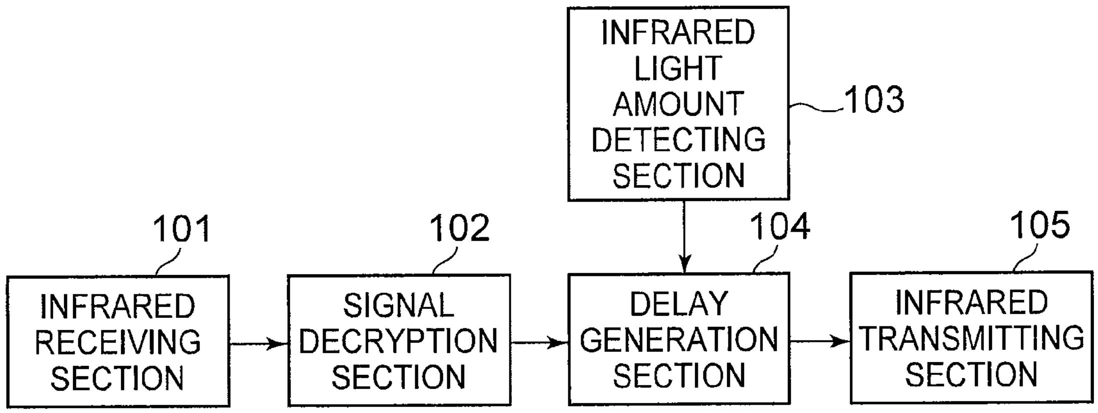
FIG. 1 is an internal block diagram of a device identification apparatus of the present embodiment.

FIG. 1 is an internal block diagram of a device identification apparatus of the present embodiment.

The device identification apparatus includes an infrared receiving section 101, a signal decryption section 102, an infrared light amount detecting section 103, a delay generation section 104, and an infrared transmitting section 105.

The infrared receiving section 101 receives an infrared signal, and passes a code signal included therein to the signal decryption section 102. The signal decryption section 102 decrypts a meaning of the code signal, and if it is a device selecting signal from the remote controller, the signal decryption section 102 causes the delay generation section 104 to generate a delay time. If the code signal is not a device selecting signal from the remote controller, the signal decryption section 102 returns the device identification apparatus into an initial state. The infrared light amount detecting section 103 reads an infrared intensity of the device selecting signal from the remote controller, and passes information thereof to the delay generation section 104. The delay generation section 104 has a function to generate a delay time specific to the device identification apparatus and a function to generate a delay time which varies depending on infrared-intensity information from the infrared light amount detecting section 103. When the delay generation section 104 receives a signal indicative of start of a delay time from the signal decryption section 102, the delay generation section 104 initially generates a delay time specific to the device identification apparatus and then generates a delay time according to infrared-intensity information received from the infrared light amount detecting section 103. The infrared transmitting section 105 transmits a device identification code signal to the remote controller.

In the above configuration of the device identification apparatus, respective device identification apparatuses have respective delay times specific thereto so that a plurality of device identification apparatuses transmits respective device identification code signals at different timings after receiving a device selecting signal output from the remote controller, thereby making it possible to prevent such a problem that device identification code signals are transmitted at the same time, and to recognize a plurality of electronic devices as an operation target by transmitting a device selecting signal only once. Further, in a case where a plurality of device identification apparatuses comes up as a candidate, their delay times are changed according to an intensity of the infrared from the remote controller, thereby making it possible to preferentially select an electronic device to which a device identification apparatus which has received a selecting signal from the remote controller more strongly is attached.

Figure 2:
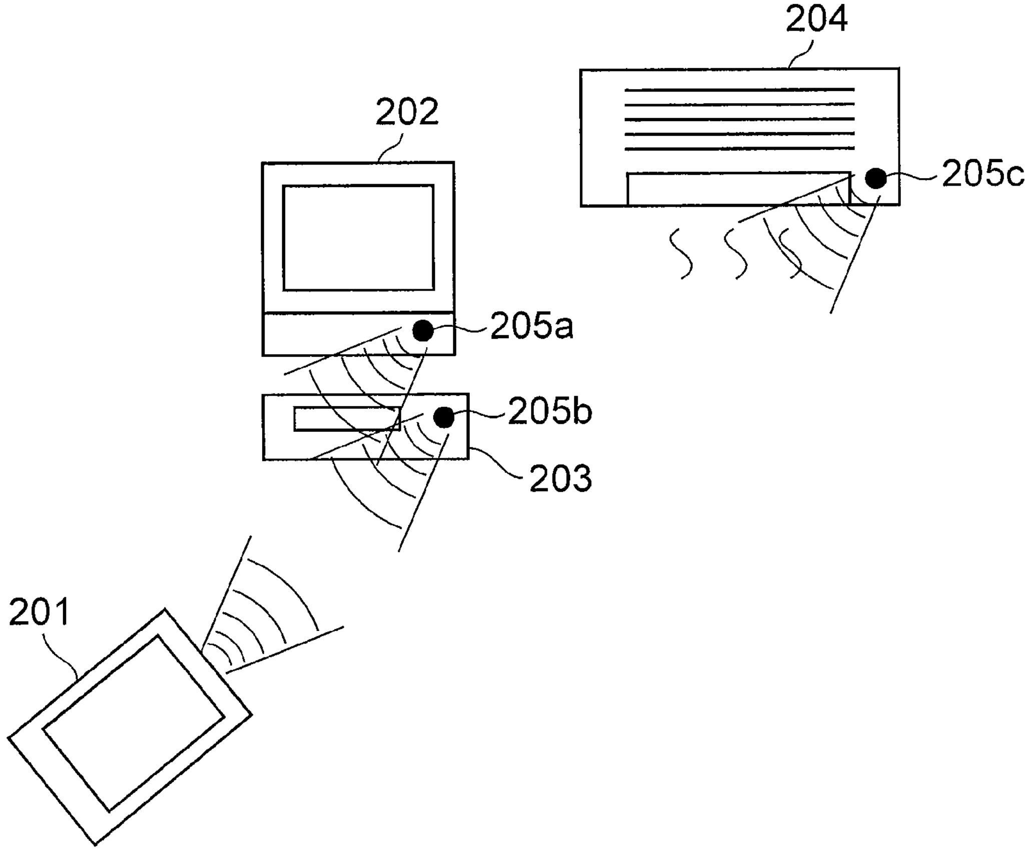
FIG. 2 is an exemplary implementation environment of a remote control system of the present embodiment.

FIG. 2 is an exemplary implementation environment of a remote control system of the present embodiment. In FIG. 2, a reference sign 201 indicates a remote controller, and reference sings 202, 203, and 204 indicate electronic devices operable by the remote controller. In this example, a smartphone having an infrared transmission and reception function is assumed as the remote controller 201, but the remote controller 201 may be other terminals having an infrared transmission and reception function. Further, a television 202, a VTR 203, and an air conditioner 204 are assumed as the electronic devices operated by an infrared remote controller, which electronic devices are taken as an operation target of the remote controller 201, but they may be other electronic devices which are remotely controlled by infrared signals. A device identification apparatus 205 is attached to each of the electronic devices at a position where an infrared signal from the remote controller 201 is easily received. The device identification apparatus 205 has a role to perform infrared communication with the remote controller 201 so as to cause the remote controller to identify which electronic device the device identification apparatus 205 is attached to.

When a user directs the remote controller 201 to a target electronic device which the user wants to operate and presses a select button on the remote controller 201, a screen of the remote controller 201 is changed into an interface to operate the target electronic device for the operation, and thus, the user is able to remotely control the target electronic device for the operation. For example, it is assumed that an interface to operate the television 202 is displayed on the remote controller 201 first. In a case where the user wants to operate the air conditioner 204, the user directs the remote controller 201 to the air conditioner 204 and presses a select button on the remote controller 201. Then, a display on the remote controller 201 is changed into an interface to operate the air conditioner 204, and thus the remote controller 201 is turned into a state where the remote controller 201 is able to remotely control the air conditioner 204. Its subsequent operation is as follows: by pressing an operation button on a touch panel, the user is able to remotely control the electronic device via the remote controller 201 in a similar manner to a general infrared remote controller.

The aforementioned exemplary implementation environment is the same as the conventional remote control system, but in the present embodiment, even in a case where a plurality of electronic devices to which the device identification apparatus is attached and which is to be an operation target exists at a short distance as illustrated in FIG. 2, an infrared signal is not interfered and it is possible to comfortably select a device which a user wants to select.

In FIG. 2, it is assumed that the television 202 and the VTR 203 are placed at a position where the infrared ray from the remote controller 201 reaches and at almost the same distance therefrom, and the air conditioner 204 is also placed at a position where the infrared ray from the remote controller 201 reaches but at a distance farther therefrom than the television 202 and the VTR 203. Further, it is assumed that the remote controller 201 is directed more precisely to a device identification apparatus 205*b* of the VTR 203 than to a device identification apparatus 205*a* of the television 202. When the user directs the remote controller 201 to the VTR 203 and presses a select button on the remote controller 201, a device selecting signal emitted from the remote controller 201 reaches the device identification apparatus 205*b* attached to the VTR 203, but the device selecting signal may also reach the device identification apparatus 205*a* attached to the television 202 placed near the VTR 203 and a device identification apparatus 205*c* attached to the air conditioner 204 which is placed in the same direction as the VTR 203 from the remote controller 201. In view of this, in the present embodiment, the device identification apparatuses have respective delay times specific thereto, and when receiving a device selecting signal from the remote controller, each of the device identification apparatuses transmits a device identification code signal after its corresponding delay time has passed. This allows respective device identification code signals from a plurality of device identification apparatuses not to reach the remote controller at the same time, thereby resulting in that the remote controller is able to receive an appropriate device identification code signal without interference.

Further, the remote control system of the present embodiment is configured such that in order to prioritize devices so that the remote controller selects a device closest thereto and precisely opposed thereto, a device having a highest infrared intensity is selected. If a device which is different from one that a user intends is selected, a device having a second highest infrared intensity is selected by a predetermined operation. Alternatively, the devices are listed and displayed in order from a higher infrared intensity, so that the user selects one from the list.

Figure 3:
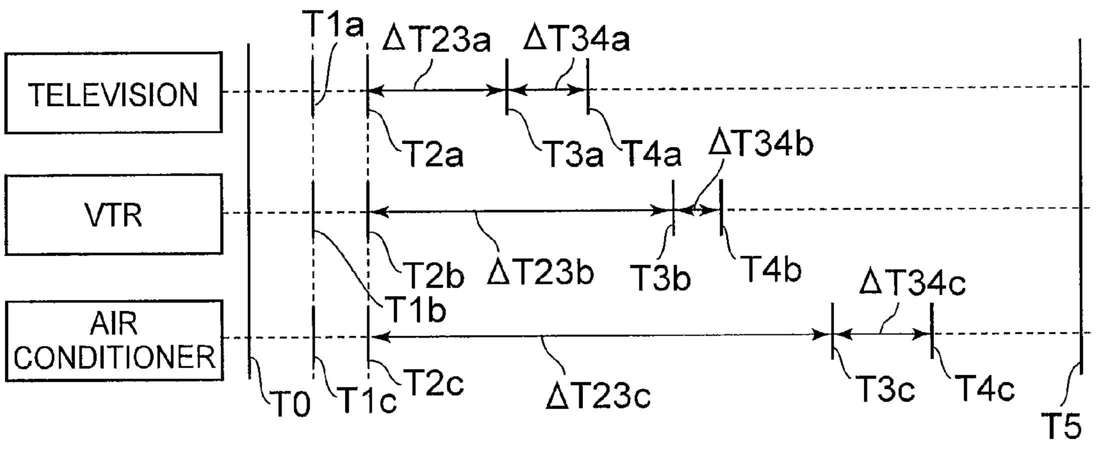
FIG. 3 is a time chart of the remote control system of the present embodiment.

FIG. 3 is a time chart of the remote control system of the present embodiment in the exemplary implementation environment in FIG. 2. In the time chart of FIG. 3, time flows towards the right side. The following describes a flow of the remote control system of the present embodiment with reference to FIG. 3.

When a select button on the remote controller is pressed, the remote controller transmits a device selecting signal (T0).

Remote controller signal detection circuits of respective device identification apparatuses attached to the television, the VTR, and the air conditioner detect a remote controller signal (T1*a* to *c*).

Signal decryption sections of the respective device identification apparatuses finish decrypting the device selecting signal which has been transmitted from the remote controller (T2*a* to *c*).

Delay times ΔT23*a* to *c* for the respective device identification apparatuses are set up.

After the delay times for the respective device identification apparatuses which are different from each other have passed (T3*a* to *c*), delay times ΔT34*a* to *c* varying depending on an intensity of an infrared signal are set up.

Infrared transmitting sections transmit respective device identification code signals to the remote controller (T4*a* to *c*).

When the remote controller receives the respective device identification code signals from the respective device identification apparatuses, the remote controller calculates delay times varying depending on an intensity of an infrared signal from information on delay times specific to the device identification apparatuses originally stored in the remote controller, and preferentially selects an electronic device to which a device identification apparatus having a high infrared signal among the received signals.

When the select button on the remote controller is still pressed, the remote controller transmits a device selecting signal again (T5).

As such, even if the device identification apparatuses attached to the respective electronic devices receive the device selecting signal transmitted at the time T0 from the remote controller simultaneously at the times T1*a* to *c*, times to transmit the respective device identification code signals are T4*a* to *c*, which are different from each other, and thus, it is possible to transmit the respective device identification code signals to the remote controller without interference with each other.

Here, in a case where a changing amount of the delay times ΔT34*a* to *c* varying depending on an intensity of infrared is equal to a difference between the delay times ΔT23*a* to *c* which are different between the respective device identification apparatuses, T4*a* to *c* become the same time, which may cause interference after all. In view of this, the change amount of ΔT34*a* to *c* should be smaller than the difference between ΔT23*a* to *c*. That is, the change amount in a delay time which varies depending on an intensity of infrared should be smaller than the difference between delay times set for the respective device identification apparatuses.

Further, in a case where any of T4*a* to *c* comes after T5 at which the remote controller transmits a device selecting signal again, the any of T4*a* to *c* and a transmission time of a device code signal in response to the device selecting signal transmitted from the remote controller at T5 may come at the same time, which may cause interference after all. In view of this, T4*a* to *c* should come earlier than T5. That is, an interval between a plurality of times at which a device selecting signal is transmitted from the remote controller should be at least longer than a maximum value of a time from transmission of a device selecting signal from the remote controller up to transmissions of respective device identification code signals from the device identification apparatuses in response to that.

As described above, by adjusting, according to an infrared light amount, a delay time of the device identification apparatus after receiving a device selecting signal from the remote controller but before transmitting a device identification code signal, electronic devices to be selected are prioritized, so that an electronic device which is closer to the remote controller and is precisely opposed to the remote controller is easily selected.

Figure 4:
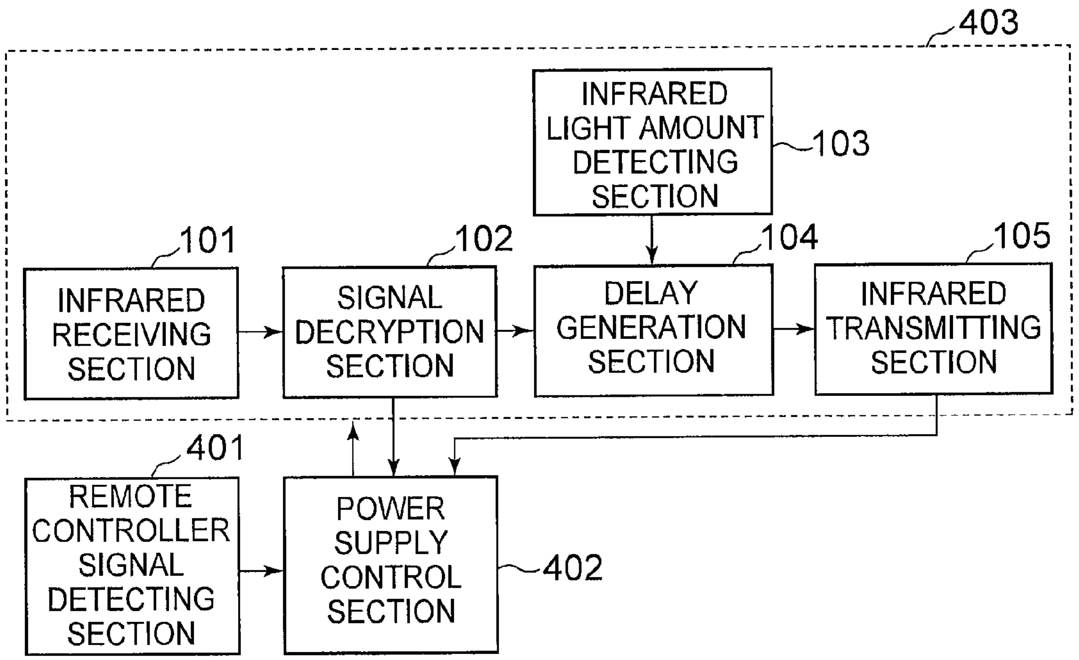
FIG. 4 is an internal block diagram of a device identification apparatus of the present embodiment in which standby power consumption is reduced.
Figure 5:
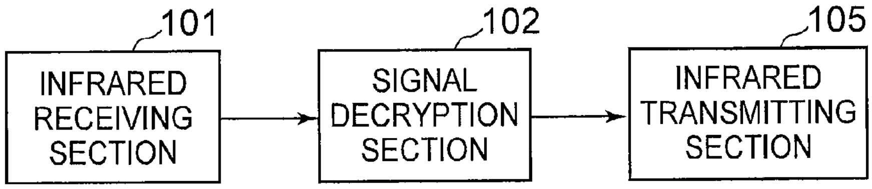
FIG. 5 PRIOR ART
FIG. 5 is an internal block diagram of a conventional device identification apparatus.

Further, with the configuration of the device identification apparatus as illustrated in FIG. 4, it is possible to restrain standby power consumption of infrared in the remote control system of the present embodiment to minimum requirement.

Upon receiving the device selecting signal from the remote controller, a remote controller signal detecting section 401 transmits, to a power supply control section 402 by use of power generation, information indicating that it has detected an infrared signal. An infrared communication section 403 is configured such that its application of power is controlled by a power supply control section 402. The infrared communication section 403 is constituted by an infrared receiving section 101, a signal decryption section 102, an infrared light amount detecting section 103, a delay generation section 104, and an infrared transmitting section 105. The infrared receiving section 101 passes code information included in the infrared signal to the signal decryption section 102. If the code information is a device selecting signal from the remote controller, the signal decryption section 102 requests the delay generation section 104 to generate a delay time. If the code information is not a device selecting signal, the signal decryption section 102 requests the power supply control section 402 to stop application of power to each section so as to return the each section into an initial state. The infrared light amount detecting section 103 passes information on an infrared light amount to the delay generation section 104. The delay generation section 104 sets a delay time specific to each device identification apparatus, and then sets a delay time according to the light amount received from the infrared light amount detecting section 103. The infrared transmitting section 105 transmits a device identification code signal, and then requests the power supply control section 402 to stop application of power to each section so as to return the each section into an initial state.

As described above, since the device identification apparatus is provided with a remote controller signal detecting section and a power supply control section so that an electric power is supplied to the infrared communication section only when an infrared signal is detected, it is possible to restrain standby power consumption of infrared in the device identification apparatus in the remote control system of the present embodiment to minimum requirement.

As has been described above, since a delay time is set in a device identification apparatus after receiving a device selecting signal from a remote controller but before transmitting a device identification code signal, any complicated circuit is not necessary to be added to the remote controller, it is possible to perform communication without any interference even in a state where a plurality of device identification apparatuses exists at a short distance, and an electronic device which is closer to the remote controller and is precisely opposed to the remote controller is easily selected. Further, needless to say, the remote control system of the present embodiment is not limited to remote control of an electronic device by an infrared signal, but also is usable for a system in which information is exchanged between electronic devices by use of optical signals in such an environment that a plurality of electronic devices exists at a short distance.

Note that, needless to say, even in such a configuration that the infrared light amount detecting section is omitted from the device identification apparatus of the present embodiment, it is also possible to realize features other than the function to prioritize devices to be selected by use of infrared light amounts so that an electronic device which is closer to the remote controller and is precisely opposed to the remote controller is easily selected.

What is claimed is:

1. A device identification apparatus for transmitting an optical device identification signal for identifying a corresponding device among a plurality of similar such optical transmitting devices to a remote controller that stores and transmits optical code signals to control the devices, the device identification apparatus comprising:

a receiving section that receives the optical code signal from the remote controller;

a signal decryption section that decrypts the optical code signal and sends a trigger signal to a delay generation section if the code signal is an optical device selecting signal, or returns the device identification apparatus to an initial state if the code signal is not an optical device selecting signal; and a transmitting section for transmitting the optical device identification signal, wherein the delay generation section is between the signal decryption section and the transmitting section, when the delay generation section receives the trigger signal, the delay generation section generates a pre-set delay time specific to the corresponding device and generates a delay time according a signal intensity of the optical code signal, such that the transmitting section transmits the device identification signal after expiration of the delay time, and such that optical signal interference from the similar such optical transmitting devices is avoided.

2. The device identification apparatus according to claim 1, further comprising:

an infrared light amount detecting section for outputting a signal to the delay generation section according to the signal intensity received by the receiving section, the signal intensity proportional to a distance between the corresponding device and the remote controller, wherein the delay generation section corrects the pre-set delay time according to the signal intensity from the infrared light amount detecting section.

3. A remote control system comprising:

a remote controller for storing and transmitting codes to control various devices; and the device identification apparatus according to claim 1 for transmitting a device identification signal to identify a corresponding device to the remote controller.

4. A remote control system comprising:

a remote controller for storing and transmitting codes to control various devices; and the device identification apparatus according to claim 2 for transmitting a device identification signal to identify the corresponding device to the remote controller, wherein the remote controller includes a delay time detecting section for comparing a delay time of a signal received from the device identification apparatus, and detects the distance to the device identification apparatus based on a correction amount of the delay time and the controller identifies the device identification apparatus having a highest signal intensity.

5. The device identification apparatus according to claim 2, wherein the corrected delay time is smaller than a difference between delay times pre-set for the respective similar such optical transmitting devices.

* * * * *